Patented Nov. 14, 1950

2,530,065

UNITED STATES PATENT OFFICE 2,530,065

SERINE SYNTHESIS

John A. King, Albany, N. Y., assignor to Sterling Drug Inc., Wilmington, Del., a corporation of Delaware No Drawing. Application December 18, 1946, Serial No. 717,077

12 Claims. (Cl. 260—482)

This invention relates to a process for the synthesis of dl-serine and its salts and to intermediates therefor.

Although several methods for the synthesis of dl-serine are available (e. g. see Schmidt, Chemistry of the Amino Acids and Proteins, second edition, 1944, pp. 90–2 and 1037; Wood and du Vigneaud, J. Biol. Chem., 134, 413–416 (1940); and Mattocks and Hartung, J. Biol. Chem., 165, 501–503 (1946)), each of these methods suffers from one or more drawbacks such as difficulty of procedure, use of expensive intermediates, and low yield of the desired product. One of the principal objects of the present invention is provision of a convenient and economical synthesis of dl-serine.

My invention comprises condensing formaldehyde and a lower alkyl acylaminomalonate in the presence of a basic condensation catalyst, whereby there is formed a lower alkyl (acylamino)hydroxymethylmalonate having the formula

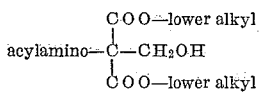

hydrolyzing the condensation product with alkali; acidifying the salt thus produced to liberate a free acid having the formula

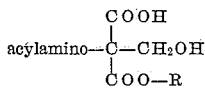

where R is hydrogen or lower alkyl; decarboxylating the free acid by heating it, thus yielding a propionic acid derivative having the formula

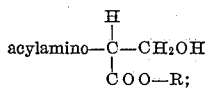

and heating the propionic acid derivative with mineral acid, thereby forming a mineral acid salt of dl-serine.

The formaldehyde can be introduced into the reaction vessel as a gas, being obtained for example by heating paraformaldehyde, or, more conveniently, it can be employed as an aqueous solution such as formalin.

As the lower alkyl acylaminomalonates employed in my process, there can be used, for example, ethyl benzamidomalonate, ethyl acetamidomalonate, n - butyl succinimidomalonate, isopropyl propionamidomalonate, and methyl phthalimidomalonate, and the resulting condensation products are, respectively, ethyl (benzamido)hydroxymethylmalonate, ethyl(acetamido)hydroxymethylmalonate, n-butyl (succinimido)hydroxymethylmalonate, isopropyl (propionamido)hydroxymethylmalonate, and methyl (phthalimido)hydroxymethylmalonate. The (lower aliphatic acylamino) malonates, such as the acetamidomalonates and propionamidomalonates, are especially useful as starting materials since the deacylation step of the serine synthesis to free the amino group will in these instances lead to formation of a water-soluble lower aliphatic acid, e. g. acetic acid or propionic acid, as a by-product, and these acids are more readily separated from the desired amino acid than are aromatic acids such as benzoic acid and phthalic acid. For reasons of economy and convenience of preparation, I prefer to use ethyl acetamidomalonate. This compound is readily available, for example by the methods described by Snyder and Smith, JACS, 66, 350 (1944), and Albertson et al., JACS, 66, 500 (1944), and it has the added advantage of containing a readily-removable acyl group, i. e. an acetyl group.

As the basic condensation catalyst, there can be used a small amount of an inorganic or an organic base, for example sodium hydroxide, potassium hydroxide, calcium hydroxide, a quaternary ammonium compound such as tetra(betahydroxyethyl)ammonium hydroxide, piperidine, pyridine, ethylamine, etc. For convenience we prefer to use an aqueous solution of sodium hydroxide as the catalyst. If the formaldehyde to be used in the condensation reaction contains any formic acid, sufficient base to neutralize the acid is first added either to the formaldehyde or to the reaction mixture, and then a small additional amount, for example 0.5–2.0 ml., of the base (1 N) is added to act as the condensation catalyst per mol.

The hydrolysis and decarboxylation of the lower alkyl (acylamino)hydroxymethylmalonates to convert them to dl-serine is conveniently effected in the following manner. The ester is treated with at least two equivalents of an alkali, for example sodium hydroxide or potassium hydroxide, thus hydrolyzing both ester groupings. On acidifying the alkaline hydrolysis mixture, there is obtained an (acylamino)hydroxymethylmalonic acid. These reactions can be represented by the following equation, where M represents one equivalent of an alkali or alkaline earth metal:

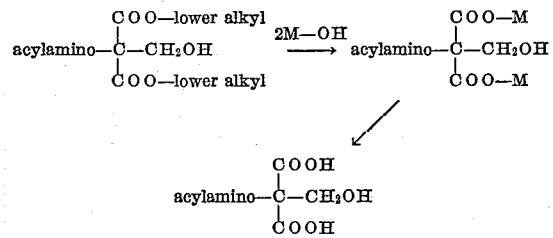

Decarboxylation of the dicarboxylic acid to a monocarboxylic acid can be effected by heating the compound at or slightly above the temperature necessary to cause the evolution of carbon dioxide. This reaction can be represented by the following equation:

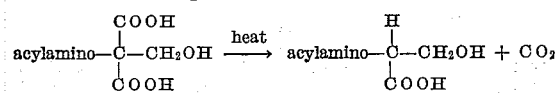

The above reaction can also be carried out by heating the dicarboxylic acid in a medium with a boiling point above the decarboxylation temperature of the dicarboxylic acid. If desired, there can be added to the alkaline hydrolysis mixture obtained in the previous step of the synthesis an amount of acetic acid in considerable excess of that necessary to effect release of the dicarboxylic acid from its alkali salt, in which case the excess acetic acid serves as a solvent, and when the mixture is boiled under reflux, decarboxylation takes place. This procedure has the advantage of avoiding the isolation of the dicarboxylic acid.

The alpha-acylamino-beta-hydroxypropionic acids obtained as products of the decarboxylation reaction are converted to dl-serine by heating with a strong mineral acid such as hydrochloric acid, sulfuric acid, phosphoric acid, etc. The dl-serine can be isolated from the reaction mixture by any conventional procedure as the mineral acid salt or as the free amino acid if desired.

Alternatively, the lower alkyl (acylamino)hydroxymethylmalonates obtained from the condensation step are hydrolyzed and decarboxylated in the following manner. The ester is treated with one equivalent of an alkali, thus yielding an alkali salt of a lower alkyl hydrogen (acylamino)hydroxymethylmalonate. Addition of acid releases the half-ester from its salt, and when this half-ester is heated, either alone or in a solvent of sufficiently-high boiling point, i. e. above 115° C., decarboxylation takes place and there is produced a lower alkyl alpha-acylamino-beta-hydroxypropionate, which is deacylated and hydrolyzed by heating with mineral acid to yield dl-serine. These reactions can be represented by the following equations:

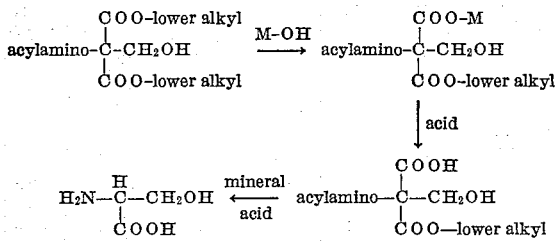

From the foregoing, it will also be appreciated that my invention comprehends a new class of compounds valuable as intermediates for the synthesis of dl-serine, said compounds having the formula

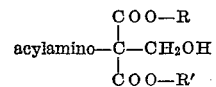

where R and R' are members of the group consisting of hydrogen and lower alkyl.

My invention is illustrated by the following examples without, however, being limited thereto.

*Example 1*

A. To a thick mush of 43.4 g. of ethyl acetamidomalonate and 25 ml. of water, there is added 17.0 g. of 37% aqueous formaldehyde solution which has been made neutral to litmus by addition of 1–2 ml. of one normal sodium hydroxide solution. Then 0.5 ml. of one normal sodium hydroxide solution is added to the mixture and it is allowed to stand for two hours. During the earlier portion of this period, all of the solid goes into solution. The clear solution is distilled under vacuum azeotropically with ethanol and benzene until all of the water and ethanol has been removed. The dry residual oil is dissolved in 300 ml. of benzene and the solution is filtered to remove a small amount of insoluble matter. To the filtrate is added slowly one liter of warm petroleum ether. From the solution there separates 48.5 g. of ethyl (acetamido)hydroxymethylmalonate, in the form of colorless crystals, M. P. 65–66° C.

B. 12.35 g. of ethyl (acetamido)hydroxymethylmalonate is dissolved in 43.5 ml. of 1.15 normal sodium hydroxide solution. The solution becomes slightly warm and a small amount of gelatinous precipitate is formed. The solution is filtered, and the filtrate is acidified with 4.5 ml. of concentrated hydrochloric acid and then evaporated to a semi-crystalline syrup in a vacuum desiccator over phosphorus pentoxide and solid potassium hydroxide. The syrupy residue is triturated with 100 ml. of anhydrous ethanol and the solution is filtered to remove the insoluble sodium chloride. The filtrate is evaporated to a thick syrup in a stream of air, the residue is dissolved in anhydrous ethanol and an equal volume of anhydrous ether is added to the solution to precipitate a small residual amount of sodium chloride. The solution is filtered and the filtrate is evaporated to a thick syrup in a stream of filtered air. On standing the syrup crystallizes. The white crystalline solid thus obtained, which weighs 5.9 g. and melts at 112–113° C. (dec.), is ethyl hydrogen (acetamido)hydroxymethylmalonate.

C. 2.19 g. of ethyl hydrogen (acetamido)hydroxymethylmalonate is heated at 125° C. until no further evolution of gas occurs. The residue is allowed to cool and is dissolved in anhydrous ethanol. Ten volumes of anhydrous ether are added to the solution, and the solution is then filtered to remove a very small amount of gelatinous material which forms. The solvents are removed from the filtrate by evaporation in a stream of air and there is obtained 1.75 g. of a pale yellow oil which consists of ethyl alpha-acetamido-beta-hydroxypropionate.

D. 1.0 g. of ethyl alpha-acetamido-beta-hydroxy-propionate is dissolved in 15 ml. of concentrated hydrochloric acid and the solution is refluxed for six hours. The solution is then evaporated to a syrup under vacuum on the steam cone. The syrup is dissolved in water, decolorizing charcoal is added to the solution, and the solution is filtered. The filtrate, which consists of an aqueous solution of serine hydrochloride, is percolated through a column of a hydrogen-ion-adsorbing material, such as an exchange resin and then is evaporated to a thick syrup on a steam cone. The syrup solidifies when it is triturated with anhydrous ethanol and the solid is washed with anhydrous ethanol and anhydrous ether. The product, which is dl-serine, is a white, powdery, amorphous solid weighing 0.22 g.

*Example 2*

12.3 g. of ethyl (acetamido) hydroxyethylmalonate, prepared for instance by the method of Example 1 (A), is dissolved in an aqueous solution of 4.2 g. of sodium hydroxide in 40 ml. of water and the resulting solution is allowed to stand for several hours. The solution is then filtered to remove a small amount of flocculent material and the filtrate is acidified with concentrated hydrochloric acid. About 50 ml. of benzene is added to the acidic solution and the mixture is distilled under vacuum at 20° C. until all of the benzene has been removed. Benzene and anhydrous ethanol are added to the distillation residue and the mixture is evaporated to a syrup. The syrup is slurried with anhydrous ethanol and the insoluble residue, which consists of sodium chloride, is separated from the solution by filtration. Two volumes of anhydrous ether are added to the filtrate to precipitate a further quantity of sodium chloride which is then removed by filtration. The solvent is evaporated from the filtrate at room temperature. The residue partially solidifies to yield 1.0 g. of large, thick, spear-like crystals of (acetamido) hydroxymethylmalonic acid. The pure compound melts at 92–93° C. When heated with concentrated hydrochloric acid, it is converted to dl-serine hydrochloride.

B. 2.47 g. of ethyl (acetamido) hydroxymethylmalonate is dissolved in 20 ml. of 1.21 normal sodium hydroxide solution and the mixture is allowed to stand at room temperature for several hours. Then 40 ml. of glacial acetic acid is added to the mixture and it is evaporated to a thick syrup on a steam cone. This residue is dissolved in 10 ml. of concentrated hydrochloric acid and the solution is refluxed for one hour. The reaction mixture is then evaporated to dryness in vacuo. The residue is dissolved in water, and the solution is made basic with ammonium hydroxide and is then evaporated to dryness. dl-Serine is isolated from the residue by fractional crystallization from ethanol-water solution.

*Example 3*

A mixture of 217 g. of ethyl acetamidomalonate and 200 ml. of water is slowly stirred, and to this thick paste is added 85 g. of 37% aqueous formaldehyde solution which has been made neutral to litmus by addition of 1–2 ml. of one normal aqueous sodium hydroxide solution. Then 1 ml. of one normal aqueous sodium hydroxide solution is added to the reaction mixture, which is slowly stirred until it becomes clear (about an hour). The reaction mixture is then allowed to stand about three hours.

To the reaction mixture, which contains ethyl (acetamido) hydroxymethylmalonate, there is added in a thin stream, with stirring, a cold solution of 90 g. of sodium hydroxide in 400 ml. of water. After the addition of the alkali is completed, the mixture is stirred for one hour and 200 g. of glacial acetic acid is then added slowly to the solution. The solution is distilled at atmospheric pressure, with continued stirring, until 600 ml. of distillate is collected. During this distillation, decarboxylation of (acetamido) hydroxymethylmalonic acid occurs, thus yielding alpha-acetamido-beta-hydroxypropionic acid, which remains in the distillation residue.

To the distillation residue is added 600 ml. of concentrated hydrochloric acid and the mixture is heated under reflux with stirring for one hour. The solution is then evaporated to dryness by heating in vacuo on a steam cone. The residue consists of crude dl-serine hydrochloride, which can be purified by recrystallization if desired. dl-Serine is obtained in conventional manner by adding an excess of ammonium hydroxide to an aqueous solution of the crude dl-serine hydrochloride, evaporating the solution to dryness, and isolating the dl-serine from the residue by fractional crystallization from ethanol-water solution. The yield of pure dl-serine is approximately 68 g., in the form of white crystals.

In the above example, instead of using ethyl acetamidomalonate, there can be used ethyl methyl acetamidomalonate, $$C_2H_5\text{-OOC-CH(NH-COCH}_3\text{)-COO-CH}_3$$

whereby there is formed as the intermediate condensation product ethyl methyl (acetamido)-hydroxymethylmalonate, $$C_2H_5\text{-OOC-C(CH}_2\text{-OH) (NH-COCH}_3\text{)-COO-CH}_3$$

When this condensation product is hydrolyzed with sodium hydroxide, heated with acetic acid, and then further hydrolyzed with hot hydrochloric acid as in the above example, dl-serine hydrochloride is produced.

I claim:

1. The process which comprises: condensing formaldehyde and a lower alkyl acylaminomalonate in the presence of a basic condensation catalyst, thereby forming a lower alkyl (acylamino) hydroxymethylmalonate having the formula

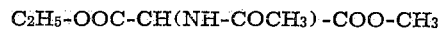

hydrolyzing the condensation product with alkali and then acidifying the basic hydrolysis mixture, thus forming an acid having the formula

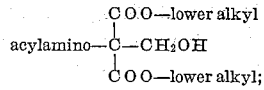

where R is a member of the group consisting of hydrogen and lower alkyl; decarboxylating said acid by heating it, thus producing a propionic acid derivative having the formula

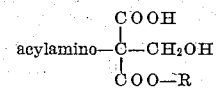

and hydrolyzing the propionic acid derivative with hot mineral acid, thereby forming a mineral acid salt of dl-serine.

2. The process which comprises: condensing formaldehyde and a lower alkyl (lower aliphatic acylamino) malonate in the presence of a basic condensation catalyst, thereby forming a lower alkyl alpha-(lower aliphatic acylamino) hydroxymethylmalonate having the formula

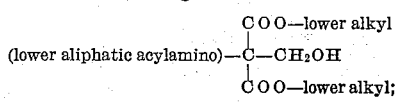

hydrolyzing the condensation product with alkali and then acidifying the basic hydrolysis mixture, thus forming an acid having the formula $$\text{(lower aliphatic acylamino)}-\underset{\underset{\text{COO}-\text{R}}{|}}{\overset{\overset{\text{COOH}}{|}}{\text{C}}}-\text{CH}_2\text{OH}$$

where R is a member of the group consisting of hydrogen and lower alkyl; decarboxylating said acid by heating it, thus producing a propionic acid derivative having the formula $$\text{(lower aliphatic acylamino)}-\underset{\underset{\text{COO}-\text{R}}{|}}{\text{CH}}-\text{CH}_2\text{OH}$$

and hydrolyzing the propionic acid derivative with hot mineral acid, thereby forming a mineral acid salt of dl-serine.

3. The process which comprises: condensing formaldehyde and ethyl acetamidomalonate in the presence of an alkali metal hydroxide catalyst, thereby forming ethyl (acetamido) hydroxymethylmalonate; hydrolyzing the ethyl (acetamido) hydroxymethylmalonate with two equivalents of alkali and then acidifying the basic hydrolysis mixture, thus forming (acetamido) hydroxymethylmalonic acid; decarboxylating this dicarboxylic acid by heating it, thus producing alpha-acetamido-beta-hydroxypropionic acid; and hydrolyzing said propionic acid derivative with hot mineral acid, thereby forming a mineral acid salt of dl-serine.

4. The process which comprises condensing formaldehyde and a lower alkyl acylaminomalonate in the presence of a basic condensation catalyst, thereby forming a lower alkyl (acylamino)-hydroxymethylmalonate having the formula $$\text{acylamino}-\underset{\underset{\text{COO}-\text{lower alkyl}}{|}}{\overset{\overset{\text{COO}-\text{lower alkyl}}{|}}{\text{C}}}-\text{CH}_2\text{OH}$$

5. The process which comprises condensing formaldehyde and a lower alkyl (lower aliphatic acylamino)malonate in the presence of a basic condensation catalyst, thereby forming a lower alkyl (lower aliphatic acylamino) hydroxymethylmalonate having the formula $$\text{(lower aliphatic acylamino)}-\underset{\underset{\text{COO}-\text{lower alkyl}}{|}}{\overset{\overset{\text{COO}-\text{lower alkyl}}{|}}{\text{C}}}-\text{CH}_2\text{OH}$$

6. The process which comprises condensing formaldehyde and ethyl acetamidomalonate in the presence of an alkali metal hydroxide catalyst, thereby forming ethyl (acetamido) hydroxymethylmalonate.

7. A compound having the formula $$\text{(lower aliphatic acylamino)}-\underset{\underset{\text{COO}-\text{lower alkyl}}{|}}{\overset{\overset{\text{COO}-\text{lower alkyl}}{|}}{\text{C}}}-\text{CH}_2\text{OH}$$

8. A compound having the formula $$\text{(lower aliphatic acylamino)}-\underset{\underset{\text{COO}-\text{R}'}{|}}{\overset{\overset{\text{COO}-\text{R}}{|}}{\text{C}}}-\text{CH}_2\text{OH}$$

where R and R' are members of the group consisting of hydrogen and lower alkyl.

9. Ethyl (acetamido) hydroxymethylmalonate, having the formula $$\text{CH}_3-\text{CO}-\text{NH}-\underset{\underset{\text{COO}-\text{C}_2\text{H}_5}{|}}{\overset{\overset{\text{COO}-\text{C}_2\text{H}_5}{|}}{\text{C}}}-\text{CH}_2\text{OH}$$

and melting at 65–66° C.

10. A compound having the formula $$\text{(lower aliphatic acylamino)}-\underset{\underset{\text{COOH}}{|}}{\overset{\overset{\text{COOH}}{|}}{\text{C}}}-\text{CH}_2\text{OH}$$

11. (Acetamido) hydroxymethylmalonic acid, having the formula $$\text{CH}_3-\text{CO}-\text{NH}-\underset{\underset{\text{COOH}}{|}}{\overset{\overset{\text{COOH}}{|}}{\text{C}}}-\text{CH}_2\text{OH}$$

and melting at 92–93° C.

12. Ethyl hydrogen (acetamido) hydroxymethylmalonate, having the formula $$\text{CH}_3-\text{CO}-\text{NH}-\underset{\underset{\text{COOH}}{|}}{\overset{\overset{\text{COO}-\text{C}_2\text{H}_5}{|}}{\text{C}}}-\text{CH}_2\text{OH}$$

and melting at 112–113° C. (dec.)

JOHN A. KING.

REFERENCES CITED

The following references are of record in the file of this patent:

Welch, Jour. Chem. Soc. of London, pages 257–261, 1930.

Dakin, Journal of Biol. Chem., vol. 154, pages 552–555, August 1944.

Albertson et al., Jour. of Amer. Chem. Soc., vol. 67, pages 308–310, February 1945.

Snyder et al., Jour. of Amer. Chem. Soc., vol. 67, pages 310–312, February 1945.

Goldsmith et al., Jour. of Amer. Chem. Soc., vol. 68, page 144, October 1945.

Certificate of Correction

Patent No. 2,530,065 November 14, 1950

JOHN A. KING

It is hereby certified that error appears in the printed specification of the above numbered patent requiring correction as follows:

Column 3, lines 10 to 12, inclusive, for "∠" read ∠ *acid*; column 5, line 15, for "hydroxyethylmalo-" read *hydroxymethylmalo-*;

and that the said Letters Patent should be read as corrected above, so that the same may conform to the record of the case in the Patent Office.

Signed and sealed this 23rd day of January, A. D. 1951.

[SEAL]

THOMAS F. MURPHY,
*Assistant Commissioner of Patents.*